United States Patent [19]
Uhlig et al.

[11] Patent Number: 5,019,022
[45] Date of Patent: May 28, 1991

[54] SPEED CHANGE ARRANGEMENT

[75] Inventors: Günter Uhlig, Gifhorn; Fritz Blumenstein; Gerhard Witte, both of Wolfsburg, all of Fed. Rep. of Germany

[73] Assignee: Volkswagen AG, Wolfsburg, Fed. Rep. of Germany

[21] Appl. No.: 391,110

[22] Filed: Aug. 7, 1989

[30] Foreign Application Priority Data

Aug. 31, 1988 [DE] Fed. Rep. of Germany ....... 3829453

[51] Int. Cl.$^5$ ............................................. F16H 37/00
[52] U.S. Cl. ........................... 475/209; 192/87.17; 475/116
[58] Field of Search ............... 475/116, 118, 121, 207, 475/208, 209, 311, 314, 315, 316, 125, 126, 127, 128, 129, 130; 192/18 A, 87.16, 87.17

[56] References Cited

U.S. PATENT DOCUMENTS

| | | | |
|---|---|---|---|
| 1,658,021 | 1/1928 | Smith | 475/316 |
| 2,919,778 | 1/1960 | Aschauer | 192/87.17 |
| 3,396,610 | 8/1968 | Rich, Jr. et al. | 475/209 |
| 3,487,726 | 1/1970 | Burnett | 475/316 |
| 3,774,474 | 11/1973 | Recker et al. | 475/209 |
| 3,971,461 | 7/1976 | Conroy et al. | 192/18 A |
| 4,178,814 | 12/1979 | Ahlen | 475/315 |
| 4,635,778 | 1/1987 | Lederman | 192/18 A |

FOREIGN PATENT DOCUMENTS

| | | | |
|---|---|---|---|
| 1625010 | 5/1972 | Fed. Rep. of Germany. | |
| 2125861 | 12/1972 | Fed. Rep. of Germany | 192/345 |
| 57-61848 | 4/1982 | Japan | 475/316 |

Primary Examiner—Allan D. Herrmann
Assistant Examiner—Ryan Massey
Attorney, Agent, or Firm—Brumbaugh, Graves, Donohue & Raymond

[57] ABSTRACT

In the embodiment disclosed in the specification, a speed change arrangement for vehicles has a mechanical toothed gear with several gear pairs that can be shifted as desired, and having a simple planet gear engaged with at least one gear pair to offer at least one additional transmission stage, having an input element, an output element, and an additional element, connectable in a first shift position by means of an hydraulically operated multi-disc brake with the surrounding housing, and in a second shift position by means of an hydraulically operated multi-disc clutch with one of the other elements. To provide this arrangement is the smallest space and at minimum expense, a disc support is connected via a first toothing with a portion of the discs of the disc brake, and via a second toothing with a portion of the discs of the disc clutch, and which is connected with an operating piston, pressurizable on either side, for the selective engagement of the disc brake and the disc clutch.

11 Claims, 2 Drawing Sheets

SPEED CHANGE ARRANGEMENT

BACKGROUND OF THE INVENTION

This invention relates to transmissions for vehicle, particularly passenger cars, having several gear pairs that can be switched as desired, and including a simple planet gear to provide at least one additional transmission stage.

Transmissions having a planet gear which is engaged after the usual gear engagements are known. In such arrangements, the planet gear, which is generally positioned separately in a side train behind the usual gearing, provides at least one additional gear with an appropriately adjusted transmission stage which can be engaged hydraulically.

German Auslegeschrift No. 1,625,010 discloses such gear arrangements including an input component, an output component and a planet gear which can be linked with the housing in a first shift position by a multi-disk brake and linked with another planet gear component in a second shift position by a multiple-disc clutch. In this arrangement, however, special operating pistons with associated ring cylinders are needed for each engagement unit. This adds to the size of the unit and increases its construction costs.

SUMMARY OF THE INVENTION

Accordingly, it is an object of the present invention to provide an improved transmission system which overcomes the above-mentioned disadvantages of the prior art.

Another object of the invention is to provide a transmission system of the above type having reduced size and construction costs.

These and other objects of the invention are attained by providing a disc support selectively engageable with a portion of a disc brake and with a portion of a disc clutch and a double-acting piston for moving the disc support into engagement with the clutch or the brake. Thus, the need for separate operating pistons and associated cylinders for the two engagement units coordinated with the planet gear, namely, the multi-disc brake and the multi-disc clutch, is eliminated. Instead, there is one operating piston, which can be activated in both directions, and which can engage the discs of both units. When one engagement unit is engaged, the other engagement unit is thereby released, so that simultaneous engagement of the two engagement units is not possible.

BRIEF DESCRIPTION OF THE DRAWINGS

Further objects and advantages of the invention will be apparent from a reading of the following description in conjunction with accompanying drawings in which.

DESCRIPTION OF THE PREFERRED EMBODIMENT

Figure 1:
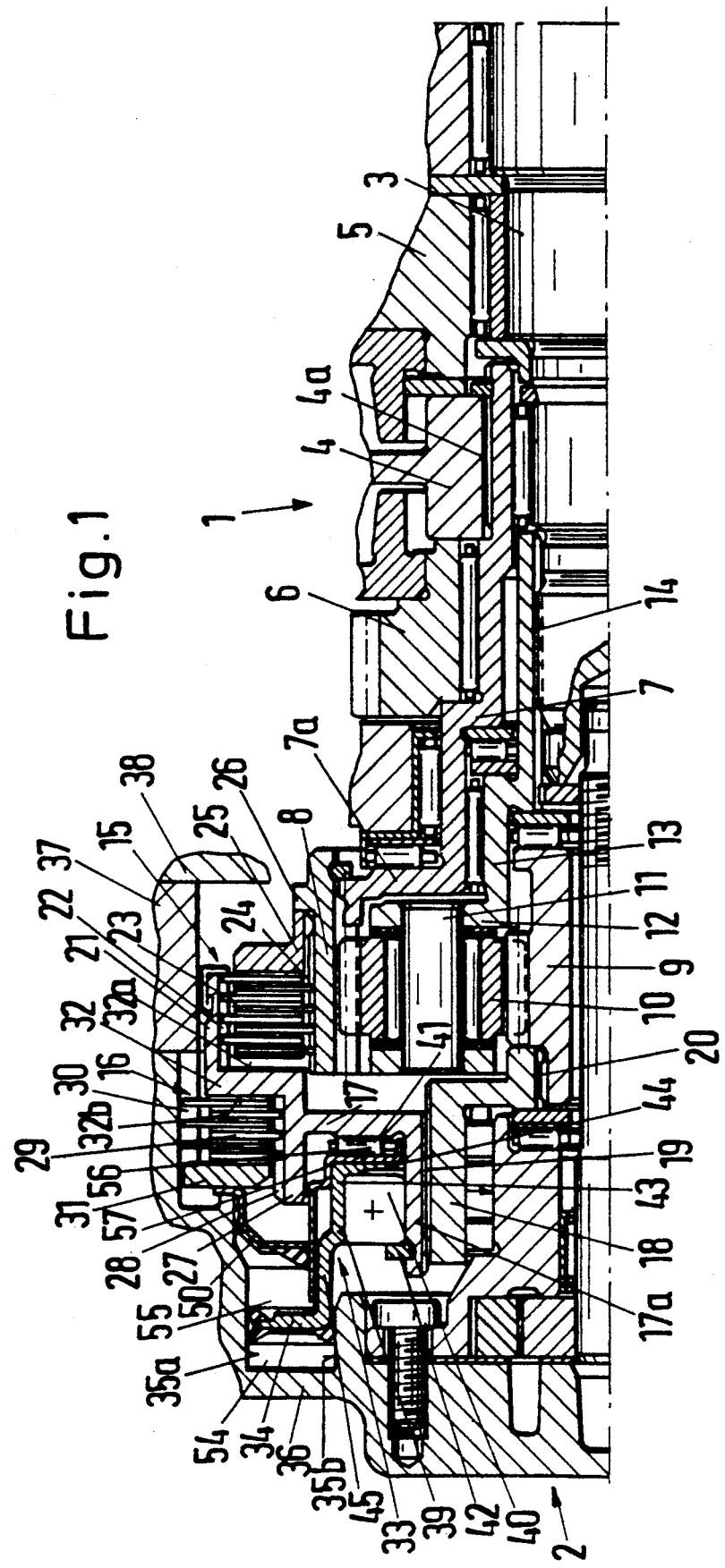
FIG. 1 is a partial sectional view illustrating a representative embodiment of a speed change gear according to the invention, with the planet gear offering at least one additional transmission stage.

In the typical embodiment of the invention shown in FIG. 1, a conventional transmission gear 1 of a passenger car is engaged to a planet gear arrangement 2 which provides at least one additional transmission stage. A drive shaft 3 affixed to the gear 1 rotatably supports two gears 5 and 6. A synchronous body 4, coordinated with the gears 5 and 6, is connected by a pin 4a to a hollow shaft 7 supported on the drive shaft 3, but is not connected to the drive shaft. The shaft 7 in turn is in a ring gear 8 of the planet gear arrangement 2 by a stem 7a.

The planet gear arrangement 2 also has a sun gear 9 and planet gears 10, which engage the sun gear 9 and are distributed evenly around it. The planet gears 10 are supported on bearing shafts 11 of a planet support 12. The planet support 12 is affixed to the gear drive shaft 3, via a second hollow shaft 13 that is positioned and housed concentrically inside the first hollow shaft 7, and a lock pin 14. The ring gear 8 thus constitutes the input component, and the planet support 12 the output component. The available transmission ratio depends on the manner in which the third element of the planet gear arrangement 2, i.e. the sun gear 9, is connected. Two different transmission stages are possible. In one case, the sun gear is attached to the fixed housing. In the other case, the sun gear is attached to another element of the planet gear arrangement, so that the planet gear then travels as a block, i.e. provides a 1:1 transmission ratio.

Two engagement elements are provided for this purpose, i.e., a multi-disc clutch 15 and a multi-disc brake 16. By selective the activation of these two elements, the sun gear 9 can be connected on the one hand with the stationary housing formed by a housing cover 36, which can be connected by way of a housing plate 37 with the gear housing 38, and on the other hand with the ring gear 8. The sun gear 9 is further connected, by locking teeth 20, with an intermediate support 18, on which a disc support 17 is permanently attached via further locking teeth 19. On its outer right end as viewed in FIG. 1, the disc support 17 has a projection 21 which moves axially, and which has internal teeth 22 which engaged some of the discs 23 of the disc clutch 15, while the other discs 23 of this disc clutch 15 are engaged by exterior teeth 24 on the ring gear 8. At the outer left end of the disc support 17 as viewed in the drawing, there is a projection 27, which also moves axially, and which has exterior teeth 28, on which some of the discs 29 of the disc brake 16 are engaged; the other discs of the disc brake 16 are engaged by interior teeth 30 in the housing 36.

When axial activation pressure is exerted by a pressure plate 32 located in the radially outer portion of the disc support 17 by axial displacement of the disc support 17, either the discs 23 of disc clutch 15 or the discs 29 of the disc brake 16 can alternately be urged into engagement with the corresponding engagement element. In one case, the face 32a of the pressure plate 32 presses the discs 23 of the disc clutch 15 against a stop plate 25, which is mounted on the exterior teeth 24 of ring gear 8 and is supported against a shoulder 26 of ring gear 8. In the other case, the face 32b of pressure plate 32 presses against the discs 29 of the disc brake 16 and urges them against a stop plate 31 which is permanently attached to the housing cover 36. The stop plate 31, in turn, compresses a gasket 50 between itself and the housing 36.

The axial motion of disc support 17 necessary for this operation is provided by an operating piston 33, which is connected to the disc support 17 by a rotatable coupling having an axially fixed relation to the disc support. The operating piston 33 also has a cylindrical translation element 39, oriented in the axial direction with a roller ring 43 at the right end as viewed in the drawing providing a radial bearing 40. The roller ring 43 has a collar 44, bent radially inwardly, which is designed on the one hand as a roller ring for a journal bearing 41, and on the other hand as a driving element for the disc support 17. Actuation of disc support 17 is accomplished by rightward motion of the piston 33 as viewed in the drawing, acting through the journal bearing 41, which is supported on the disc support 17. Upon piston motion in the opposite direction, the collar 44, which abuts the rolling elements of the radial bearing 40, transfers the motion through the rolling elements of the radial bearing. The rolling elements are retained by a snap ring 42 on a boss 17a of the disc support 17.

Figure 2:
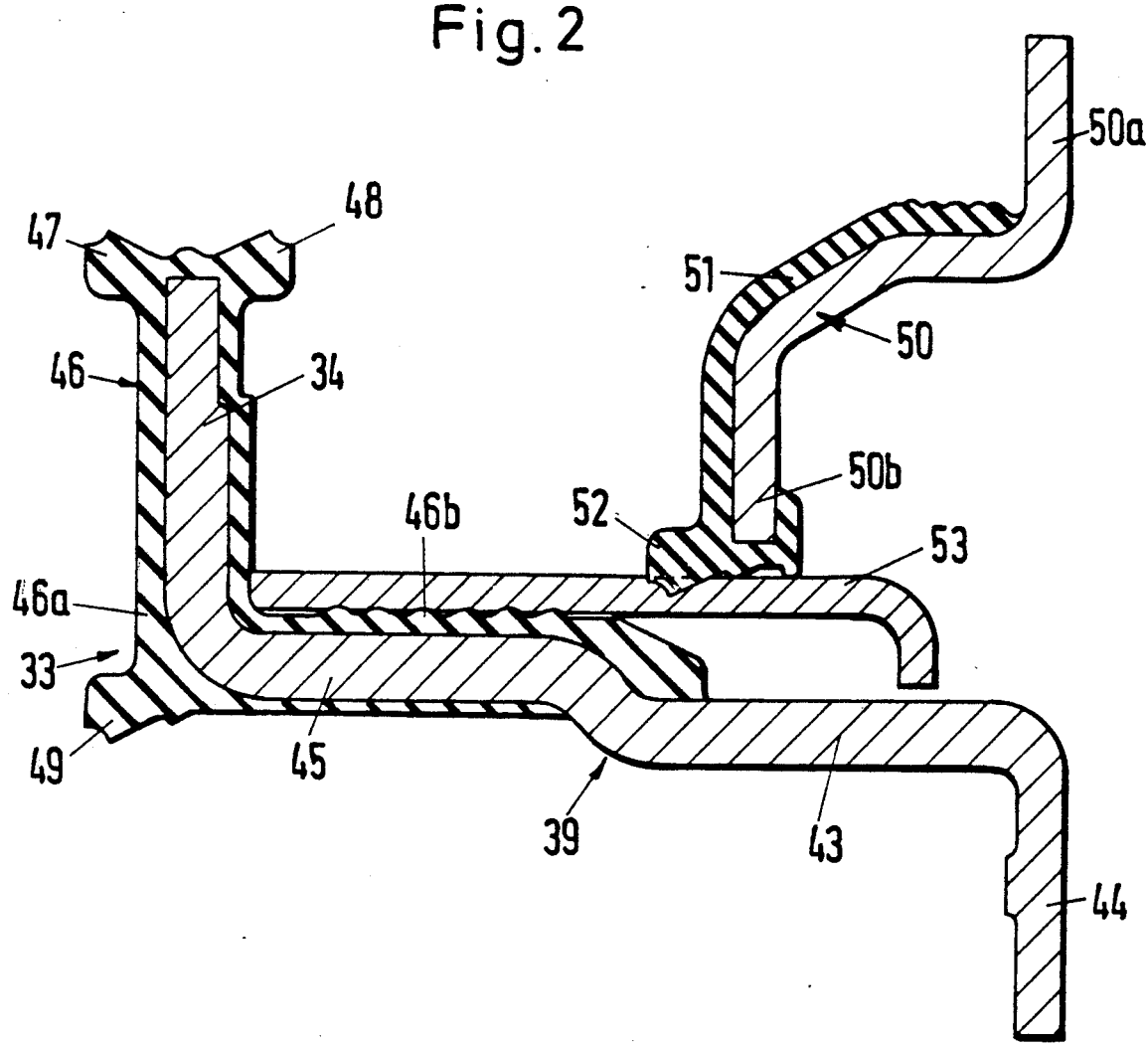
FIG. 2 is an enlarged fragmentary sectional view of the embodiment shown in FIG. 1 showing the operating piston and a gasket that collaborates with the operating piston to seal off a pressurized region.

As shown in FIG. 2, the operating piston 33 has, in addition to the roller ring 43, a radial extension 34 and an axial connector 45, both of which are coated with a vulcanized, flexible, rubberized material 46. At the radial ends of the oscillating piston 34, this rubberized material 46 is shaped, by means of appropriate shaping processes, into sealing lips 47–49. Referring back to FIG. 1, these sealing lips slide on the adjacent surfaces 35a and 35b of a cylinder which is formed in the housing 36. A first pressurization chamber 54 is formed on the left side of the oscillating piston 34 as viewed in the drawing, between the oscillating piston 34 and the housing 36, and a second pressurization chamber 55 is formed on the other side of the oscillating piston 34. The pressurization chamber 55 is enclosed by the housing 36, the operating piston 33, and the gasket 50. To seal off this second pressurization chamber 55, the gasket 50, which is attached by its radial exterior end 50a between the housing cover 36 and the stop plate 31 of the disc brake 16, also has a layer 51, made of a vulcanized, rubberized material as shown in FIG. 2. The vulcanized layer 51 is shaped into sealing lip 52 at the radial inner end of the gasket 50b. This sealing lip slides on a casing 53, press-fitted over the connector 45, which has a rubberized coating 46b. A disc 56 housing the journal bearing 41 is bent into a stop stem 57 at its radially outer end to secure the cylindrical casing 53 against axial motion. This arrangement prevents the sealing lip 52 of the gasket 50 from sliding directly on the operating cylinder 33, which in turn prevents the applied rubberized coatings from being stripped away.

An important advantage of the invention is that, by selective pressurization of the chambers 54 and 55, the operating piston, and hence the multi-disc support 17, are adjusted in one direction or the other, whereupon one of the engagement elements is engaged by compression of its coordinated discs, and the other engagement element is disengaged. Thus, in a relatively small space and with relatively few components, a double operation of the two engagement elements is facilitated, which at the same time prevents a control error from causing simultaneous engagement of both engagement elements.

In the illustrated embodiment, the engaged planet gear arrangement 2 is connected with the synchronous body 4 of the two gears 5 and 6, so that a total of two additional transmission stages are provided. Thus, when the multi-disc clutch 15 is engaged, a 1:1 transmission ratio is provided by the planet gear arrangement. When the multi-disc brake 16 is engaged a step down transmission ratio is provided by the planet gear arrangement. Thus, by means of an appropriate design of the gear toothing for gears 5 and 6, when the disc brake is engaged a low transmission ratio is provided, and when the disc clutch is engaged a higher transmission ratio is provided. The planet gear can not only be connected to the toothed gear; the connection can also be in other ways, for example by connection of the planet gear arrangement to a gear wheel.

The engagement of the disc brake or disc clutch, and hence the relevant coordinated gear translation into the individual shift positions of manual gear shift 1, can be automated. In addition, the pressurization of the chambers 54 and 55 can be accomplished by, for example, solenoid valves that, depending on the velocity of the vehicle and the output of the drive engine, and depending also on accelerator position (kick-down), shift the individual gear transmissions according to one or more shift programs that can, for example, be pre-selected. The driver of the vehicle then has to shift only four stages, and this too can be replaced by automated hydraulic shifting. The shifting of the other two stages (in the embodiment illustrated in the drawing) then occurs automatically.

In manual shifting of the two high gears, provision can be made for only the higher transmission ratios, corresponding to a fourth and sixth gear, to be shifted, and for the lower transmission ratios, corresponding to a third and fifth gear, to be reached only in full-load situation or upon activation of a kick-down shift. However, it is also possible to shift gears 3 and 4 or 5 and 6 in sequence, depending on velocity and load. In this case, however, a switch-back by kick-down would be advisable. It is evident from the foregoing that the nature of the automatic shifting of the planet gear can be implemented according to a wide variety of points of view with a wide variety of programs.

Although the invention has been described herein with reference to a specific embodiments, many modifications and variations therein will readily occur to those skilled in the art. Accordingly, all such variation are included within the intended scope of the invention.

We claim:

1. A speed change arrangement for vehicles comprising a plurality of gear pairs that can be switched as desired, planetary gear means connectable with the gear pairs having an input element, an output element, and at least one additional element, the planetary gear means including multi-disc brake means providing a first shift position and multi-disc clutch means providing a second shift position, disc support means connected with discs in the multi-disc brake means and the multi-disc clutch means and double-acting piston means for selectively moving the disc support means to actuate the multi-disc brake means or the multi-disc clutch means.

2. A speed change arrangement according to claim 1 wherein the disc support means includes a first stem having external teeth engaging the discs of the disc brake means, and a second stem having internal teeth engaging the discs of the disc clutch means, and pressure plate means designed for the activation of the disc support means to engage the disc brake means or the disc clutch means selectively.

3. A speed change arrangement according to claim 1 including housing means having a ring-shaped cylinder, wherein the piston means includes an oscillating piston segment extending in the radial direction and movable in the ring cylinder of the housing means, the oscillating piston segment having sealing lips for sealing pressurization chambers on opposite sides of the oscillating piston segment.

4. A speed change arrangement according to claim 3 wherein the sealing lips are provided by a shaped layer of a resilient material applied to the piston means.

5. A speed change arrangement for vehicles comprising a plurality of gear pairs that can be switched as desired, planetary gear means connectable with the gear pairs having an input element, and output element, and at least one additional element, the planetary gear means including multi-disc brake means providing a first shift position and multi-disc clutch means providing a second shift position, disc support means connected with discs in the multi-disc brake means and the multi-disc clutch means and piston means, for selectively moving the disc support means to actuate the multi-disc brake means or the multi-disc clutch means, wherein the disc support means is connected with the piston means by a rotatable connector which has an axially fixed relation to the disc support means.

6. A speed change arrangement for vehicles comprising a plurality of gear pairs that can be switched as desired, planetary gear means connectable with the gear pairs having an input element, an output element, and at least one additional element, the planetary gear means including multi-disc brake means providing a first shift position and multi-disc clutch means providing a second shift position, disc support means connected with discs in the multi-disc brake means and the multi-disc clutch means and piston means, for selectively moving the disc support means to actuate the multi-disc brake means or the multi-disc clutch means, wherein the piston means includes an axially oriented cylindrical member supported by a radial bearing and a journal bearing on the disc support means.

7. A speed change arrangement according to claim 4 wherein the cylindrical member includes a collar providing a roller ring which engages an axially oriented rolling element of the radial bearing.

8. A speed change arrangement for vehicles comprising a plurality of gear pairs that can be switched as desired, planetary gear means connectable with the gear pairs having an input element, and output element, and at least one additional element, the planetary gear means including multi-disc brake means providing a first shift position and multi-disc clutch means providing a second shift position, disc support means connected with discs in the multi-disc brake means and the multi-disc clutch means and piston means, for selectively moving the disc support means to actuate the multi-disc brake means or the multi-disc clutch means, including housing means and gasket means extending in the radial direction and affixed at the outer end to the housing means and providing a sealing lip at the inner end engaging the piston means.

9. A speed change arrangement according to claim 8 wherein the sealing lip seals engages a cylindrical casing sealed to a cylindrical translation segment of the piston means.

10. A speed change arrangement according to claim 9 wherein the cylindrical casing is press-fitted to a portion of the cylindrical translation segment of the operating piston that is coated with a resilient material.

11. A speed change arrangement according to claim 10 wherein the cylindrical casing is secured against axial sliding by means of a stop stem on a housing disc.

* * * * *

UNITED STATES PATENT AND TRADEMARK OFFICE
CERTIFICATE OF CORRECTION

PATENT NO.   : 5,019,022

DATED        : May 28, 1991

INVENTOR(S)  : Uhlig et al.

It is certified that error appears in the above-identified patent and that said Letters Patent is hereby corrected as shown below:

Title page, 12th line of ABSTRACT, "is" should read --in--.

Col. 5, line 7, "and output" should read --an output--.

Col. 6, line 3, "claim 4" should read --claim 6--;

line 10, "and output" should read --an output--.

Signed and Sealed this

Eighth Day of December, 1992

Attest:

DOUGLAS B. COMER

*Attesting Officer*       *Acting Commissioner of Patents and Trademarks*